United States Patent [19]

Bonsack

[11] 4,183,899

[45] Jan. 15, 1980

[54] CHLORINATION OF ILMENITE AND THE LIKE

[75] Inventor: James P. Bonsack, Aberdeen, Md.

[73] Assignee: SCM Corporation, New York, N.Y.

[21] Appl. No.: 885,442

[22] Filed: Mar. 10, 1978

Related U.S. Application Data

[63] Continuation-in-part of Ser. No. 817,719, Jul. 21, 1977, abandoned, and Ser. No. 817,587, Jul. 21, 1977, abandoned.

[51] Int. Cl.$^2$ ............................................. C01G 23/02
[52] U.S. Cl. .......................... 423/79; 75/33; 75/34; 423/76; 423/83; 423/492; 423/493; 423/149
[58] Field of Search ......................... 423/74, 76, 83, 79, 423/77, 149, 492, 493, DIG. 16; 75/1 TI, 34, 29

[56] References Cited

U.S. PATENT DOCUMENTS

| | | | |
|---|---|---|---|
| 2,701,179 | 2/1955 | McKinney | 423/74 |
| 2,733,983 | 2/1956 | Daubenspeck | 423/149 |
| 3,050,362 | 8/1962 | Oppegaard et al. | 423/79 |
| 3,067,005 | 12/1962 | Nelson et al. | 423/74 |
| 3,495,936 | 2/1970 | Jones | 423/79 |
| 3,859,077 | 1/1975 | Othmer | 423/149 |
| 3,977,862 | 8/1976 | Glaeser | 423/76 |
| 3,977,863 | 8/1976 | Glaeser | 423/76 |
| 3,977,864 | 8/1976 | Glaeser | 423/76 |
| 3,989,510 | 11/1976 | Othmer | 423/492 |
| 4,017,304 | 4/1977 | Glaeser | 423/79 |

OTHER PUBLICATIONS

Pascal, *Nouveau Traite de Chemie Minerale*. Tome IX, Masson et Cie, Paris (1963) pp. 67.

*Primary Examiner*—Herbert T. Carter
*Attorney, Agent, or Firm*—Merton H. Douthitt; Jerry K. Mueller, Jr.

[57] ABSTRACT

Ferruginous titaniferous material is chlorinated with chlorine for producing a product stream of titanium chlorides and by-product metallic iron in a laminar flow process.

42 Claims, 15 Drawing Figures

4,183,899

CHLORINATION OF ILMENITE AND THE LIKE

CROSS-REFERENCE TO RELATED APPLICATIONS

This application is a continuation-in-part of application U.S. Ser. No. 817,719, filed July 21, 1977, and a continuation-in-part of application U.S. Ser. No. 817,587, filed July 21, 1977, both of said applications now being abandoned.

BACKGROUND OF THE INVENTION

1. Field of the Invention

This invention relates to the recovery of the titanium values in titaniferous materials and more particularly to recovery of such values by chlorination techniques.

While chlorination techniques for recovery of the titanium values in titaniferous materials have proved successful, such techniques are most successful when limited to the use of titaniferous materials rather depleted in iron content. Use of ferruginous titaniferous materials, such as ilmenites or the like, complicates recovery of the titanium values from the material because of the affinity of chlorine to attack the iron values initially, causing formation of unwanted iron chlorides. The art is replete in theoretical and practical teachings on practice of such chlorination techniques and little need be stated here for the artisans of this field, except that the need for economic and efficient recovery of the titanium values of titaniferous material uncomplicated by iron chloride formation yet exists.

2. Description of the Prior Art

The art is virtually silent in proposing to selectively chlorinate the titanium values of the titaniferous material with $Cl_2$ whereby substantially no iron chloride is formed. Perhaps the only proposal in this area is that of Wilcox (U.S. Pat. No. 2,589,466) wherein an ilmenite ore and chlorine gas, each separately preheated to about 1250°–1500° C., are fed to a chlorination zone maintained within such temperature range and wherefrom substantially pure titanium tetrachloride vapors are withdrawn, while substantially all the iron content of the feed ore remains in the solid residue in the chlorination zone.

Of more recent vintage are the proposals of Glaeser (U.S. Pat. Nos. 3,977,862; 3,977,863; 3,977,864 and 4,017,304) wherein titaniferous materials, such as ilmenite, are selectively chlorinated at about 950° to 1400° C. for removal of $TiCl_4$ without an appreciable net yield of iron chloride from the iron constituent of the feed ore and whereby such iron constituent is recoverable in the metallic state. Such selective chlorination is accomplished with chlorinating agents of ferrous chloride, ferrous chloride and $Cl_2$, ferrous chloride and HCl, and HCl in combination with at least two of the following members of the group consisting of $FeCl_2$, $FeCl_3$, and $Cl_2$. Also of more recent vintage is the proposal of Othmer (U.S. Pat. No. 3,989,510) wherein the selective chlorination of the titanium constituent of the ore is accomplished by charging a hot chlorinator (1535°–1950° C.) with the ore, silica, alkali metal or alkaline earth metal chloride, and carbonaceous reductant. Products formed are vaporous $TiCl_4$, molten metallic iron, and molten silicate flux containing various of the ore impurities.

Of significance, too, is the total chlorination process. A total chlorination process comprises chlorinating the iron-bearing titaniferous material at elevated temperature with chlorine gas in at least stoichiometric proportion for formation of titanium tetrachloride and iron chlorides. The disadvantages of total chlorination techniques are obvious and include loss of chlorine in the form of iron chlorides, contamination of product titanium tetrachloride stream with iron chlorides, and a substantial waste disposal problem of such iron chlorides formed in the process.

Heretofore, it has been accepted principle in this art that when chlorinating ferruginous titaniferous ores with $Cl_2$, all (or substantially all) of the iron must be chlorinated first before any of the titanium can be chlorinated. Total chlorination processes as above-described are based upon this principle. The present invention, though, permits chlorination of the titanium in the ferruginous titaniferous feedstock to occur while concomitantly converting at least some of the iron in the feed to metallic iron, i.e. suppression of iron chloride formation.

SUMMARY OF THE INVENTION

The present invention is a flow process for chlorinating ferruginous oxidic titaniferous material having an iron to titanium molar ratio (Fe/Ti) of x:1, x being a positive number, for producing titanium chlorides and by-product metallic iron. Such flow process comprises passing through a reaction zone maintained at about 1050°–1950° C. in substantially laminar flow a mixture of said titaniferous solids in finely-divided form, carbonaceous reductant, and a chlorinating agent selected from chlorine gas, HCl, an organo-chloride, metallic chlorides having less of an affinity for chlorine than iron has and mixtures thereof, there being not more than (x+2) moles of chlorine provided from said chlorinating agent per gram-atom of titanium in said titaniferous material, the atomic ratio of carbon in said mixture to the oxygen content in said mixture being greater than 1:1 for formation of CO; withdrawing from said zone a product stream containing said titanium chlorides comprising $TiCl_4$, said by-product metallic iron, carbon monoxide, and iron chlorides comprising $FeCl_2$, the molar ratio of chlorine from said chlorinating agent to said titanium in said titaniferous solids ($Cl_2$/Ti), said iron to titanium ratio (Fe/Ti) in said titaniferous solids, and said reaction zone temperature being those whereby neither all of said chlorine nor all of said iron in said titaniferous solids is converted into iron chlorides withdrawn from said zone.

A preferred embodiment of the present invention is a flow process for essentially completely chlorinating the titanium content of iron-bearing titaniferous solids whereby said iron is converted to metallic form. Such flow process comprises passing said mixture in substantially laminar flow through the reaction zone maintained at about 1350°–1950° C., the atomic ratio of carbon in said mixture relative to the oxygen content in said mixture being greater than 1:1 for formation of CO, the ratio of the moles of chlorine in said chlorinating agent to said titanium in said titaniferous solids being not substantially above about 2 and the ratio of iron to titanium (Fe/Ti) in the titaniferous solids passed into said zone being not above 2. The (Fe/Ti) ratio and the reaction zone temperature are those whereby the net chlorination of said titanium and reduction of said iron is in a steady state. From the zone is withdrawn a product mixture containing titanium chlorides comprising titanium tetrachloride, metallic iron, carbon monoxide, and iron chlorides comprising ferrous chloride. The iron chlorides are separated from said withdrawn product stream and are recycled to said reaction zone. In more preferred embodiments of the present invention, titanium trichlorides contained in the product stream are oxidized with make-up chlorinating agent to titanium tetrachloride and the iron chlorides are separated from said withdrawn product stream by quenching, such as with liquid titanium tetrachloride.

Advantages of this preferred embodiment of the present flow process include that essentially pure product titanium chlorides are withdrawn from the process and the iron in the titaniferous feed is removed as elemental iron, i.e. essentially no iron chlorides are contained in the crude titanium chloride product stream withdrawn from the process. Iron chlorides formed in the reaction zone are withdrawn therefrom and are recycled to the reaction zone for efficiency and economy (i.e. no net loss of chlorine as iron chloride and prevention of iron chloride contamination in the crude titanium chloride product).

Thus, in this application the present process involves no recycle of any components to the reaction zone, while the preferred embodiment of the invention includes a recycle of some unreacted iron chlorides exiting the reaction zone. The basic thermodynamics and operating conditions for the process and for the preferred embodiment are distinct and such distinctions should be borne in mind throughout this application.

DETAILED DESCRIPTION OF THE INVENTION

Figure 1:
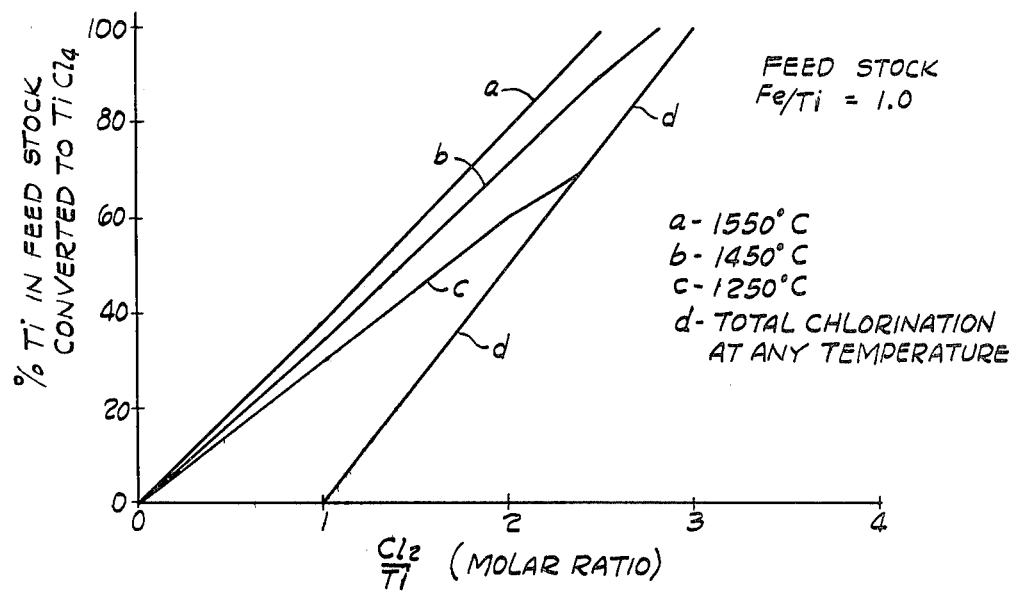
FIGS. 1 through 8 depict graphically the correlations of the three fundamental parameters for practice of the present process.
Figure 2:
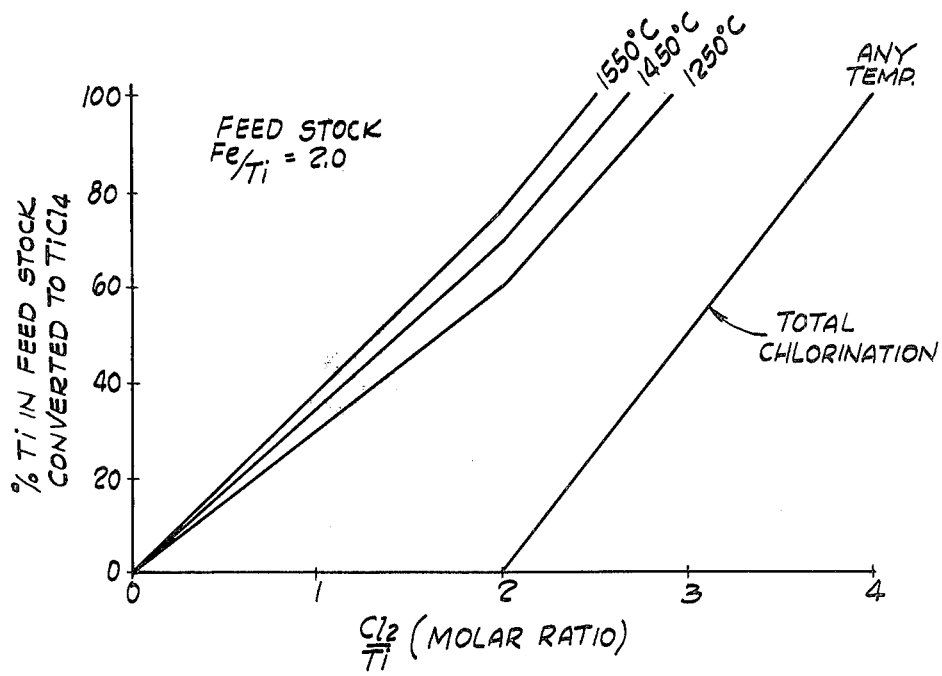

For ease of description and understanding of the present invention, several definitional and usage terms are given for this application. Ferruginous (iron-bearing) titaniferous material is the feedstock for the present process and, often, the term "ore" will be used for convenience as most titaniferous solids of interest will be an ore or derived from an ore source. Ilmenites are prime examples of such ores. On occasion, titaniferous ores relatively starved in titanium values and rich in iron values can be admixed with suitable titaniferous-rich slags or the like and such mixture provides a suitable source of feedstock for the present process. The chlorinating agent for the present invention most often will be chlorine gas and often the term "$CL_2$" will be used herein for convenience and not by way of a limitation. Other suitable chlorinating agents include organochlorides, which can be fully chlorinated carbons (chlorocarbons) such as, for example, carbontetrachloride, or which can be partially chlorinated such as, for example, carbonylchloride (phosgene), hexachlorobenzene, and the like. Further suitable chlorinating agents include metallic chlorinating agents having less of an affinity for chlorine than has elemental iron, as shown by Othmer et al in "Metal Ordering by Chlorine Affinities for Oxides", Preprint of Paper Presented at the Metallurgical Society 102nd AIME Meeting, p. 13, (February 27, 1973). Yet another suitable chlorinating agent is hydrochloric acid (HCl), preferably in vapor form.

While conversion of all of the titanium content of the feedstock is most desirable for the present process, in practical terms essentially complete conversion of the titanium to product titanium chlorides means conversions of at least about 75%, advantageously greater than about 85% and preferably greater than about 90%. In the preferred embodiment, "essentially complete" conversion of titanium to titanium chlorides and of iron to metallic iron is achieved when at least about 75% of the titanium and iron are so converted and usually such conversions will be at least about 85% with conversions of greater than 90% quite practical in commercial scale operations. Also, while the desired product of this process is titanium tetrachloride, it must be recognized that at the elevated temperatures of operation of the present process, significant amounts of titanium trichloride can be formed and most often a mixture of the tetrachloride and trichloride forms will be produced by the present flow process. For convenience the desired chlorinated titanium product will be referred to by titanium chlorides in this application. Further, the iron chlorides which also can form in the present process most likely will be ferrous chloride at the elevated temperatures of operation for the present process, though it must be recognized that minor amounts of ferric chloride may also be found in the present process.

A key factor in the success of the present process is the recognition and correlation of several fundamental parameters which permit titanium chlorides to be produced without converting all of the iron in the feedstock to iron chlorides. In other words, conversion of at least some of the iron in the feedstock to by-product metallic iron while production of some titanium chlorides is an improvement over and substantial step forward in the chlorination art, such as typified by total chlorination processes. Though several parameters in the present process admittedly interact and affect the operation of the present process, the following three parameters are believed to be the most determinative of the present process: (1) the composition of the feedstock as measured by the molar ratio of the iron to titanium (Fe/Ti) in the feedstock, (2) the molar ratio of the chlorine in the chlorinating agent to the titanium content of the feedstock ($Cl_2$/Ti), and (3) the reaction temperature. Thus, successful commercial operation of the present process can be based on economic and plant operational considerations by judicious selection of values for the foregoing three fundamental parameters. In order to more fully understand the significance of these three parameters and be able to properly correlate them for successful practice of the present process, a detailed description of the drawings illustrating them follows.

DETAILED DESCRIPTION OF THE DRAWINGS

Though the overall or net reaction in the present process involves the conversion of titanium in the feedstock to product titanium chlorides and conversion of iron in the feedstock to metallic iron and iron chlorides, such overall or net reaction is likely to be the result of several intermediate and/or competing reactions which can be theorized for the process. All of the drawings relate to the overall or net reaction involved in the present process and all values reported in the drawings are calculated from thermodynamic data reported in *JANAF Thermochemical Tables*, 2nd Edition (1971). The thermodynamic calculations used in deriving the drawings assumed that the feedstock consisted of those iron and titanium species that are stable under the indicated reduction-chlorination conditions. For feedstocks of comparatively lower oxygen (or oxide) content (e.g., Fe/Ti ratios of less than about 2), the stable species of iron and titanium can be produced by the reduction conditions existing in the chlorination zone. It is assumed that reduction precedes chlorination under the reduction-chlorination conditions provided in the present process. Alternatively and preferably, especially for comparatively high oxygen (or oxide) containing feedstock (e.g., Fe/Ti ratios of 2 and greater), the feedstock can be prereduced in conventional fashion.

Figure 3:
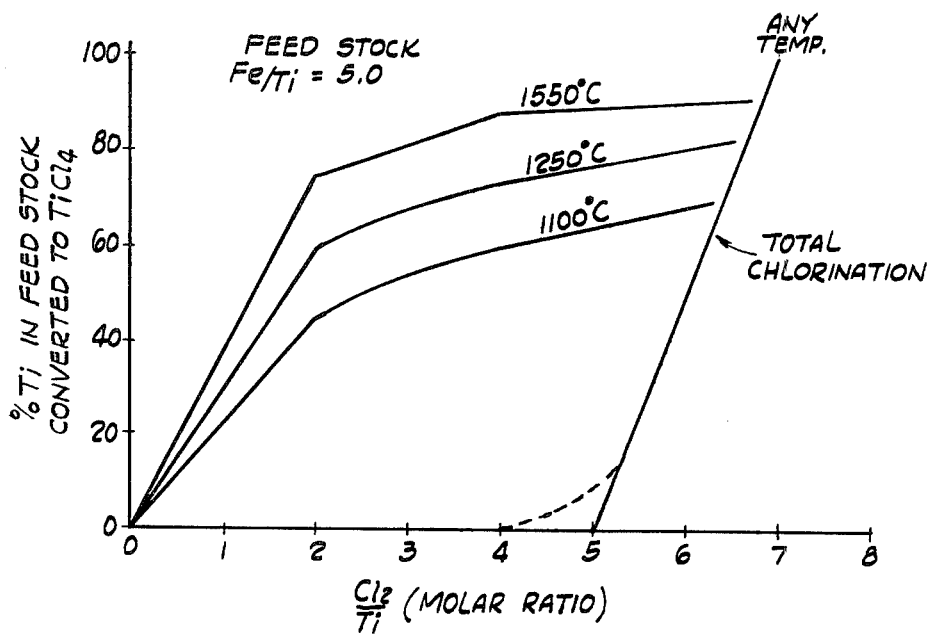
Figure 4:
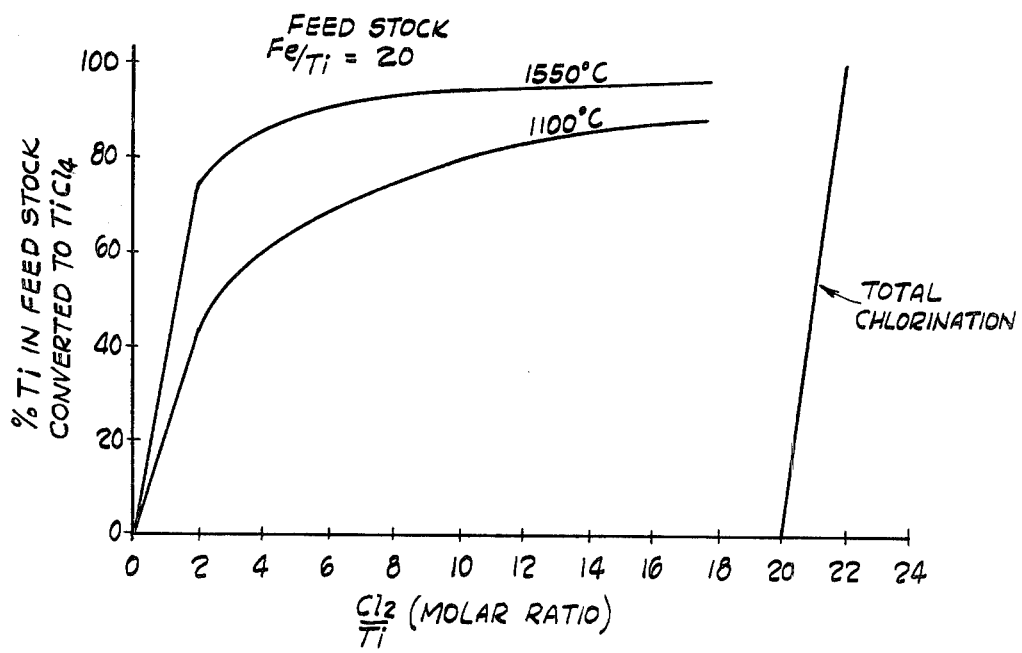

FIGS. 1 through 4 depict the mole percent of titanium in the feedstock converted to product titanium tetrachloride as a function of the molar ratio of chlorine in the chlorinating agent to titanium in the feedstock ($Cl_2/Ti$) at various reaction temperatures for a feedstock having an Fe/Ti ratio of 1, 2, 5 and 20. Feedstocks with Fe/Ti ratios of 5, and especially 20, are so rich in iron that they may be more properly classified as iron ores rather than titaniferous ores, though the present flow process can handle such ores for recovery of the titanium content therefrom. Also shown on these drawings are the results for a state-of-the-art total chlorination process which is virtually independent of reaction temperatures above about 600° C. As shown in FIG. 3, the total chlorination curve, while theoretically a straight line as in the other Figures, actually has a slight slope to it initially (dotted line). This result is based on actual operation of beneficiation processes. That is, no chlorination of titanium occurs until about 85% of the iron has been chlorinated, at which time some titanium chlorination does occur. When all of the iron has been chlorinated, about 10% at most of the titanium will have been chlorinated also. However, in both prior beneficiation and total chlorination processes, none of the iron in the ore is converted into metallic iron. The most striking feature shown in these drawings is the fact that the present invention can be operated to convert virtually all of the titanium in the feedstock to product titanium chlorides using less chlorine than is required in a total chlorination process. One less obvious showing in these drawings is that at least some of the iron in the feedstock is not chlorinated and is in fact converted to metallic iron.

Figure 5:
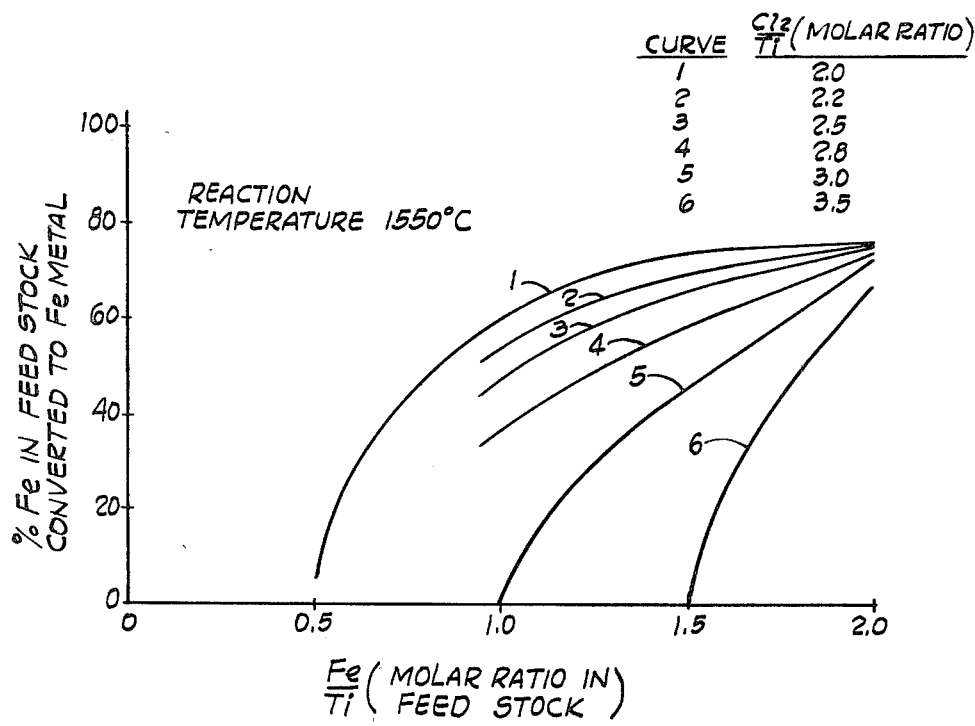
Figure 6:
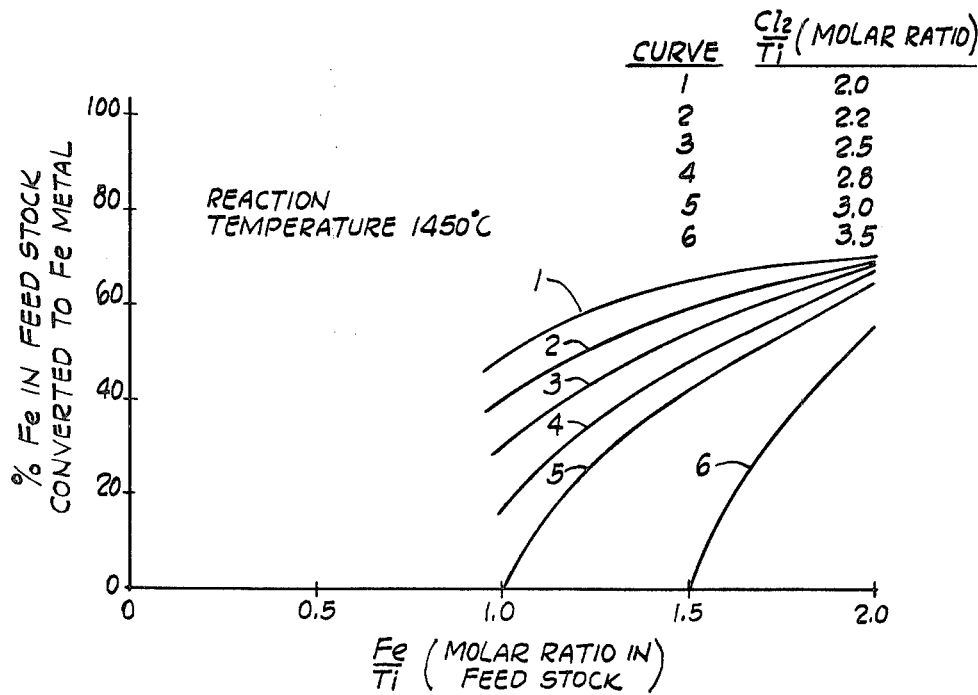
Figure 7:
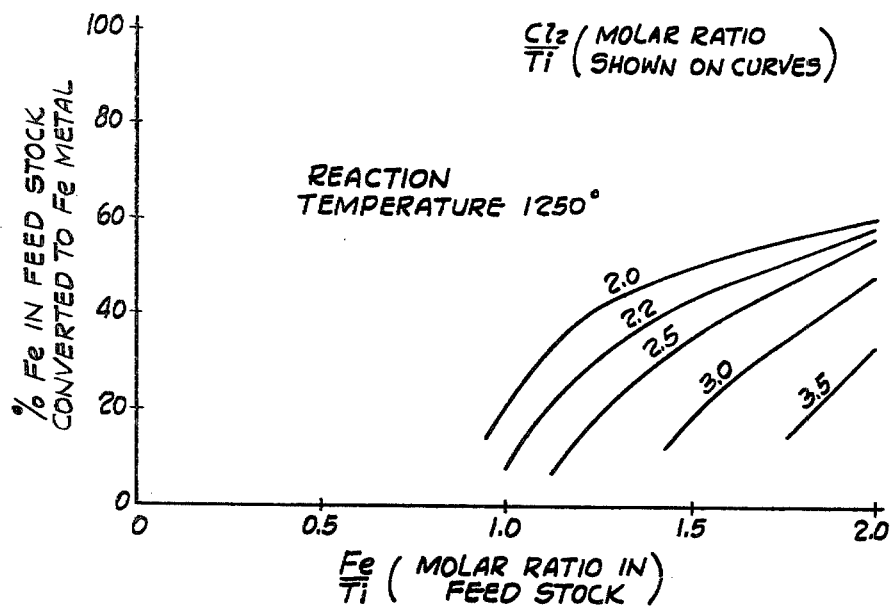

This can be readily seen by referring to FIGS. 5 through 7. FIGS. 5 through 7 depict graphically, at a given temperature for each of said drawings, the molar percent of iron in the feedstock which is converted to by-product metallic iron as a function of the feedstock composition, as given by the molar ratio of Fe/Ti, at various molar ratios of $Cl_2/Ti$. From FIGS. 5 through 7, it is readily apparent that while conversion of 100% of the iron in the feedstock to by-product metallic iron is not feasible practically, the present process does permit significant conversion of the iron in the feedstock to by-product metallic iron while obtaining substantial conversion of titanium in the feedstock to product titanium chlorides (as shown on FIGS. 1 through 4). The present process can, thus, be designed for commercial practice based upon economic and processing considerations because of the good flexibility which the process permits in predetermining the product composition of titanium chlorides and metallic iron at a multitude of values for the reaction temperature, the feedstock composition, and the proportion of chlorine consumed per mole of titanium in the feedstock.

Broadly, reaction temperatures can range from about 1050° to 1950° C. Advantageous reaction temperatures are from about 1250° to 1750° C. and preferably about 1300° to 1600° C. The feedstock composition Fe/Ti molar ratio can range broadly from about 0.25:1 to about 100:1, typically about 0.25:1 to 20:1, advantageously about 0.25:1 to 5:1, and preferably about 0.5:1 to 2:1. Advantageously, the molar ratio of chlorine to titanium ($Cl_2/Ti$) will be greater than about 2:1 and preferably such ratio will be from about 2:1 to 3.5:1, depending largely upon the feedstock Fe/Ti ratio. It should be recognized that at very high chlorination temperatures where $TiCl_3$ would predominate in the product, the molar ratio of chlorine to titanium would need only be about 1.125:1, assuming about a 75% conversion of feed titanium to product $TiCl_3$ which, as a practical matter for commercial operation, is required. At lower temperatures where $TiCl_4$ is the predominant product, such ratio would need to be above 1.5:1 at the indicated conversion figure assuming only $TiCl_4$ as the product. Since a mixture of $TiCl_4/TiCl_3$ likely is formed, the $Cl_2/Ti$ ratio should be selected according to the particular reaction conditions and feedstock actually used.

Figure 8:
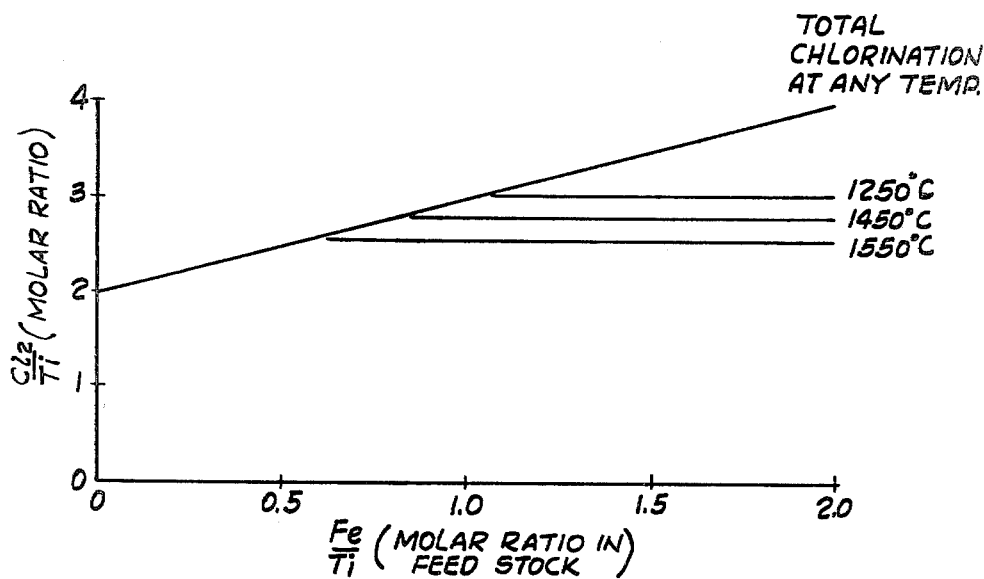

FIG. 8 depicts graphically the molar ratio of chlorine from the chlorinating agent to titanium in the feedstock ($Cl_2/Ti$) as a function of the Fe/Ti ratio in the feedstock at various temperatures which are required for conversion of all of the titanium in the feedstock to product titanium tetrachloride. This drawing shows that the present process can be operated to convert virtually all of the titanium in the feedstock to product titanium chlorides over a wide range of feedstock compositions and over a wide range of reaction temperatures at a substantially constant ratio of $Cl_2/Ti$. It is interesting that the ratios of $Cl_2/Ti$ are constant even at increasingly higher iron containing ores for converting virtually all of the titanium in the feedstock into titanium chlorides.

In the following discussion of FIGS. 9 through 12 which relate to the preferred embodiment, it should be clearly understood that steady-state conditions (as herein defined) for the process prevail in the reaction zone. Also, the net reaction outlined below and attendant reaction relationships developed therefrom provide a theoretical limitation on the present process, i.e. define a set of relationships within which operation of the present process preferably should be practiced.

Figure 9:
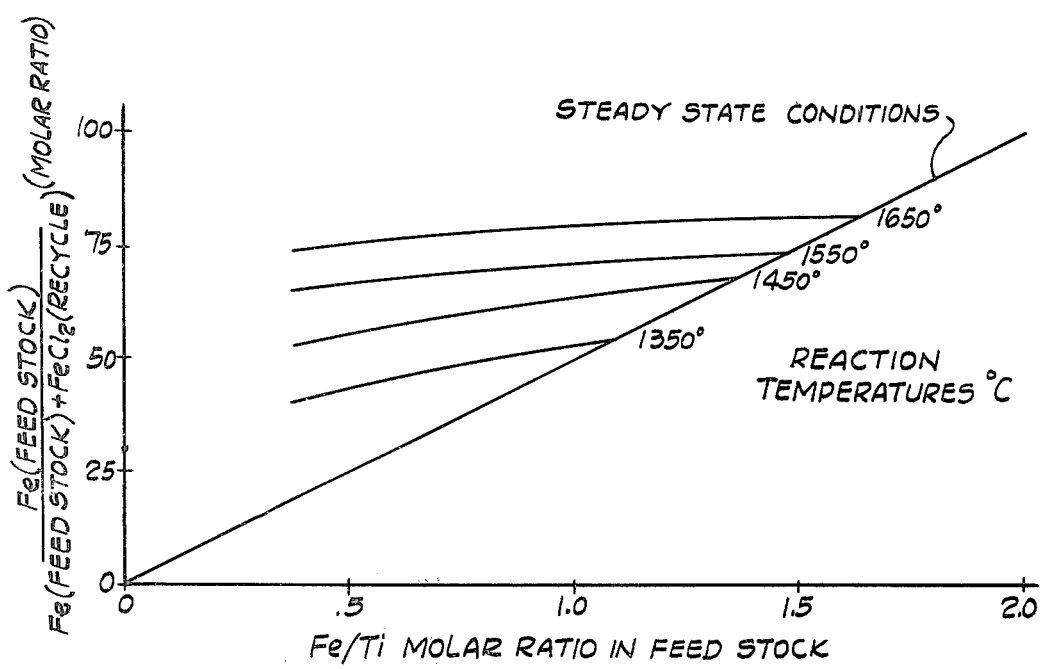
FIGS. 9 through 12 depict graphically the fundamental relationship between the Fe/Ti ratio in the feed and the reaction temperature for the preferred embodiment of the present process and provide further details for its operation.

More specifically, the following description of the present process relates to the diagonal line on FIG. 9 labeled "Steady-State Conditions". Operation of the present process above (or to the left of) such steady-state line is within the scope of the present invention, while operation below (or to the right of) such line leads to an unsteady-state mode of operation of the present process which should be avoided.

The overall or net reaction postulated for the preferred embodiment of the present process under steady-state conditions can be expressed conventionally as follows:

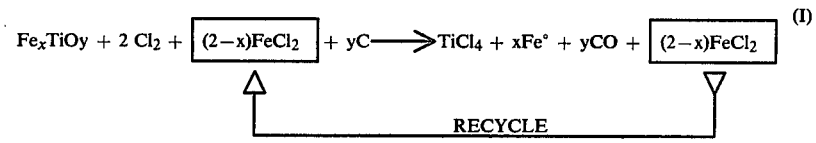

$$\text{Fe}_x\text{TiO}_y + 2\text{Cl}_2 + \boxed{(2-x)\text{FeCl}_2} + yC \longrightarrow \text{TiCl}_4 + x\text{Fe}^\circ + y\text{CO} + \boxed{(2-x)\text{FeCl}_2} \quad (I)$$

with RECYCLE loop between the boxed terms.

The foregoing reaction equation represents the overall or net reaction thought to be involved in the present process and is likely to be the result of several intermediate and/or competing reactions which can be theorized for the process. Of prime importance to the present process is the recognition that the feedstock composition, as measured by the Fe/Ti molar ratio, substantially determines the outcome of the chlorination reaction when related to the reaction temperature.

In reaction equation (I), the indicated molar ratio of chlorine to feed titanium in the feedstock is shown to be 2:1, but it is to be understood that with a minimum conversion of titanium in the feedstock to product titanium chlorides of about 75%, such ratio ($Cl_2/Ti$) need only be 1.125:1 at very high temperatures assuming $TiCl_3$ as product and 1.5:1 at lower temperatures assuming $TiCl_4$ as product. Since a mixture of $TiCl_4/TiCl_3$ likely is the product, the $Cl_2/Ti$ ratio should be chosen according to the reaction conditions and feedstock actually used.

Three additional relevant reaction relationships can be developed from reaction equation (I) as follows:

$$\frac{\text{Fe (ore)}}{\text{Fe (ore)} + \text{FeCl}_2 \text{ (recycle)}} = \frac{1 \text{ Fe}}{(2) \text{ Ti (feed composition)}} = \frac{x}{2} \quad [Ia]$$

$$\frac{CL_2}{\text{FeCl}_2} = \frac{2}{2-x} \quad [Ib]$$

$$\frac{\text{FeCl}_2}{\text{Ti}} = 2-x \quad [Ic]$$

Note that all of the foregoing reaction relationships are based on the feed composition, Fe/Ti, which from reaction equation (I) has the value of x:1.

The relationship expressed in reaction ratio (Ia) can be related further to the reaction temperature and FIG. 9 depicts this relationship graphically as a plot of the molar ratio of iron in the feedstock to total iron (both recycle $FeCl_2$ and iron in the feedstock) entering the reaction zone as a function of the feed composition, as expressed by the ratio of Fe/Ti in such feed, at various temperatures of operation (isotherms) for the process. This molar ratio (Ia) is a measure of the iron content in the recycle stream entering the reaction zone under steady-state operation of the process. Ideally, the value of this molar ratio is 1, i.e. no iron chlorides available for recycle; however, attainment of this is not practical and some iron chlorides will be recycled in the process. The "steady-state conditions" diagonal line, referred to above, defines a boundary of operation for the present process as measured by the Fe/Ti ratio of the feedstock and the reaction zone temperature and graphically is a protrayal of reaction ratio (Ia) at various reaction zone temperatures of the process. For present purposes "steady-state conditions" are attained when the overall reaction in the zone (i.e. net chlorination of the titanium and reduction of the iron) is in a steady-state (i.e. reaction is at equilibrium). This results in the proportion of iron chloride recycle being substantially constant. Each point along the steady-state line corresponds to a minimum reaction temperature required to maintain steady-state operation of the process at a particular Fe/Ti ratio of the feedstock and with temperatures below which essentially complete conversion of all incoming Ti in the feed to product $TiCl_4$ and all incoming Fe in the feed to by-product Fe° will not be realized (i.e. a net increase of iron chlorides from the iron values of the feed admitted to the process). The present process of course can be operated at a multitude of Fe/Ti values and reaction temperatures and the present process still retain the essential completeness of product $TiCl_4$ and by-product Fe° formation.

Temperatures of operation for this preferred embodiment should be at least about 1350° C. in order to maintain a favorable equilibrium for formation of products and obtain reasonable rates of reaction. At an upper temperature limit of about 1950° C., essentially no iron chlorides are available for recycle, but attainment of this is probably not within present commercial operations, though thermodynamically it does appear theoretically possible. Advantageous temperatures of operation for the present process range from about 1350° to 1650° C. The feed composition is limited to Fe/Ti ratios of less than 2, and for practical commercial scale operations such ratios more often are from about 0.25 to about 1.65, and most often are about 0.5 to 1.5.

Figure 10:
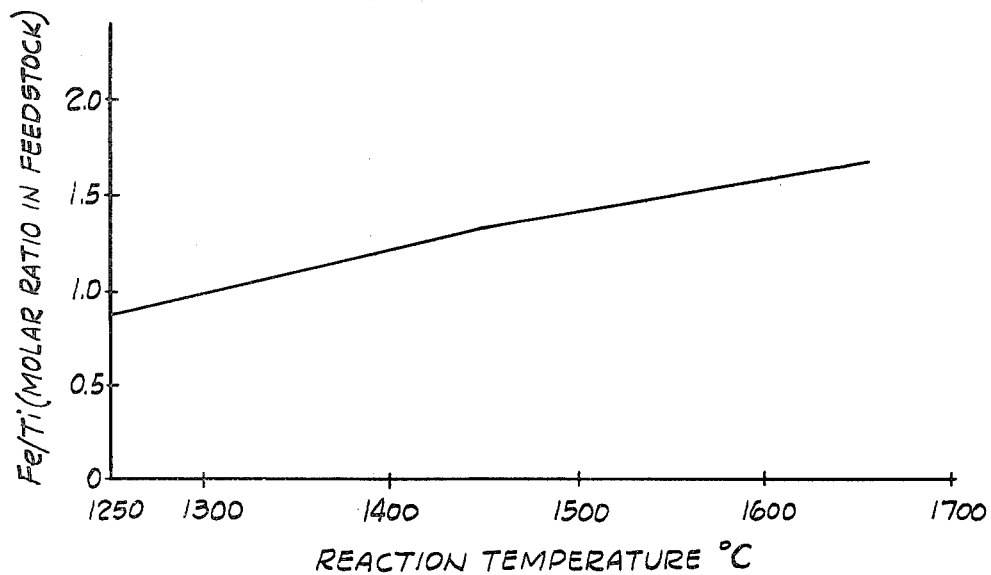

The relationship between the Fe/Ti ratio of the feed and reaction temperature for steady-state operation can be stated in another form than that discussed above. That is, for any given reaction temperature (within the range of about 1350° to 1950° C.), there is a maximum Fe/Ti ratio of the feed at which a steady-state operation of the present process will be retained. FIG. 10 depicts this by a plot of the Fe/Ti ratio of the feedstock as a function of reaction temperature.

Figure 11:
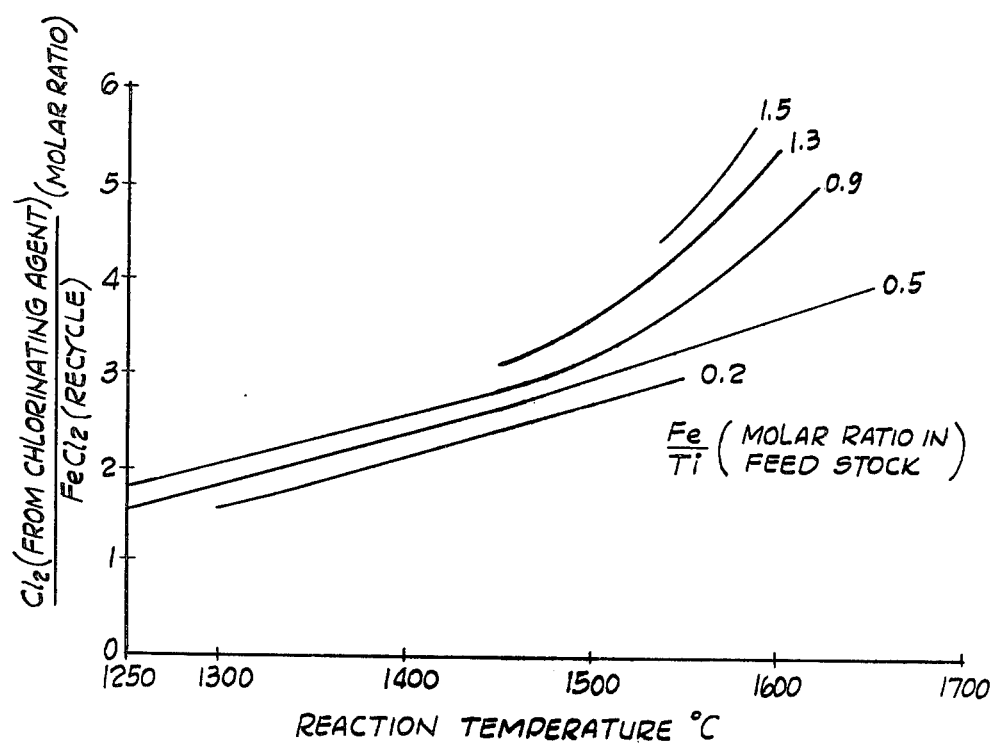
Figure 12:
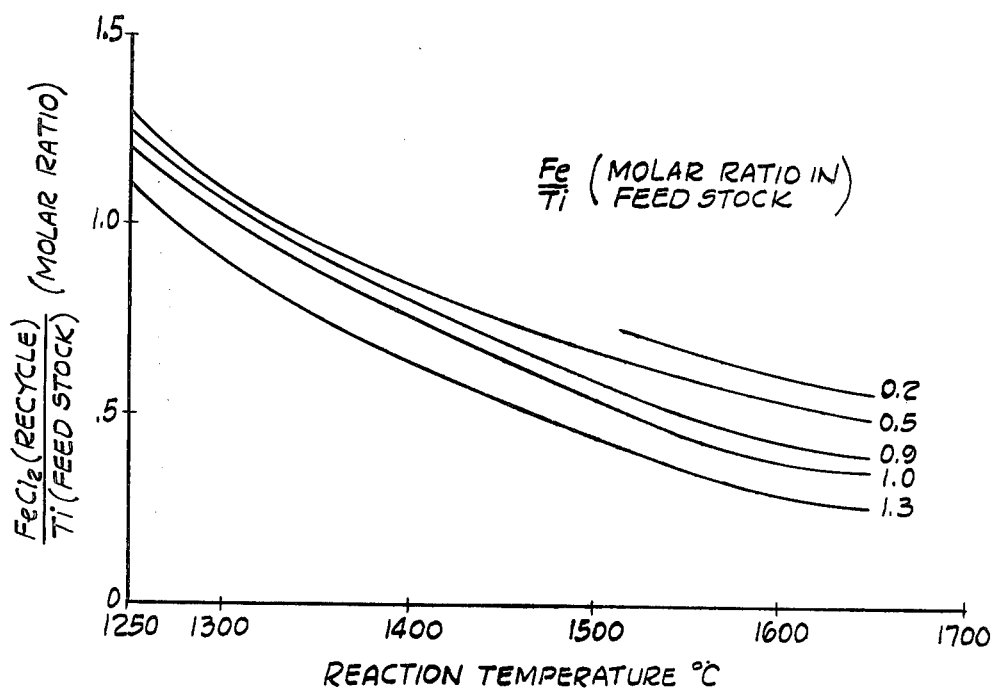

For a given value of the Fe/Ti ratio of the feedstock and a given reaction temperature sufficient to maintain a steady-state operation, the values of the reaction ratios (Ib) and (Ic) are set. That is, the Fe/Ti ratio of the feedstock substantially determines the amount of $FeCl_2$ recycle at a given reaction temperature. FIG. 11 depicts reaction ratio I(b) graphically as a function of reaction temperature at various values of the Fe/Ti ratio and FIG. 12 depicts reaction ratio (Ic) graphically as a function of reaction temperature at various values of the Fe/Ti ratio. One obvious observation from FIGS. 11 and 12 is that the amount of iron chlorides withdrawn from the process for recycle is small both in relation to the $Cl_2$ content of the chlorinating agent and is also small in relation to the titanium in the feedstock. One less obvious observation is that at a given reaction temperature, higher values of the Fe/Ti ratio of the feedstock correspond to smaller amounts of iron chlorides in the recycle stream. The same is true generally as reaction temperatures increase.

DETAILED DESCRIPTION OF THE PROCESS

In accordance with the present invention, iron-bearing (or ferruginous) titaniferous solids are reacted with $Cl_2$ in the presence of carbonaceous reductant for recovery of a stream of crude titanium chlorides and by-product elemental iron. In the present process, two relatively important factors are necessary for proper operation of the process. The first factor is that the amount of $Cl_2$ provided from the chlorinating agent should be less than stoichiometric for conversion of all of the iron and all of the titanium in the feedstock into their respective chloride forms. In the preferred embodiment, however, it can be seen from reaction (I) that the amount of chlorine contained in the chlorinating agent should be approximately stoichiometric for formation of product $TiCl_4$. It should be recognized, however, that at the elevated reaction temperatures at which the reaction zone is maintained, there can be a significant amount of $TiCl_3$ formed. Thus, the molar ratio of $2Cl_2$ to Ti should be considered as a practical upper limit and often lesser amounts of chlorine will be required. Chlorine gas chlorinating agent is preferable and suitably can be plant-grade chlorine gas, such as normally found in titanium dioxide pigment plants which utilize chlorine gas for chlorination of titaniferous ores, so-called "chloride process". Other instances of readily available tonnage chlorine gas can be found in other commercial operations also. Typically, such chlorine gas need contain only about 60%–80% chlorine gas by volume with typical diluents such as nitrogen, oxygen, carbon monoxide and similar gases which are inert to the net chlorination reaction of the present process or are combustible for maintaining the reaction zone hot.

A second factor is that the amount of carbonaceous reductant should be at least stoichiometric for formation of carbon monoxide with the oxygen content of all materials fed to the reaction zone in the reaction mixture (titaniferous feed, chlorinating agent and carbonaceous reductant). Usually, though, the greatest oxygen content passed into the zone comes from the titaniferous feedstock (usually in oxide form). The feedstock can be prereduced in conventional fashion prior to its passage into the reaction zone and the amount of carbonaceous reductant then would be based on the remaining oxygen (oxide) content in the prereduced feedstock fed to the zone (and other oxygen sources as mentioned above). Conventional prereduction comprehends heating the feedstock under reducing conditions at a temperature of abut 600° using hydrogen gas reductant to about 1200°–1300° C. using a solid carbonaceous reductant for about 6 minutes on up to about 4–6 hours in order to reduce the oxidic titanium and oxidic iron in the feedstock.

Preferably, the carbonaceous reductant is a finely-divided solid carbonaceous reductant such as, for example, coke, charcoal, carbon, coal, or the like. Alternatively, the carbon content of some chlorocarbon chlorinating agents can provide the requisite carbonaceous reductant for the present process. Also, hydrocarbons such as, for example, benzene, acetylene, propane, and the like, can be successfully used as carbonaceous reductants for the present process. Hydrocarbon reductants and the like can be used in the present process because of the discovery that the hydrogen content therein (and even in the combined water in the titaniferous feedstock) elutes from the zone predominantly as hydrogen gas and not as HCl even though free chlorine may be present in the mixture fed to the reaction zone. As a practical matter, the present process should be operated with a slight to moderate stoichiometric excess of titaniferous ore relative to the chlorine content in the chlorinating agent and of carbonaceous reductant relative to the oxygen content in the feed mixture.

It should be noted also that pre-heating of the titaniferous feedstock can be quite beneficial to the process, especially when pre-reduction of the feedstock is practiced. Such pre-heating can be a supplemental heat input to the reaction where the reaction zone also is heated, or the pre-heating step can be the total heat input to the reaction where no heating of the reaction zone is practiced. This latter operational mode can be quite attractive to the overall process when combined with pre-reduction of the feedstock. In fact, to such operation can be added a coking operation involving the conversion of coal (as the carbonaceous reductant) into coke. Thus, pre-reduction of the feedstock, coking of coal, and pre-heating of the feedstock/carbonaceous reductant solids mixture can be an advantageous embodiment of the present invention.

The ore and carbonaceous reductant (when solid carbonaceous reductant is used) are fed to the process in finely-divided form. Suitable such solids will be predominantly less than about 40 microns (weighted diameter average) and substantially all such solids should pass through a 325 mesh sieve (U.S. Standard Sieves Series). High surface area of the ore and carbonaceous solids is believed to significantly influence completeness of the reaction, thus the finely-divided solids preference. Larger solids can be used, also, provided that they have a relatively high surface area, such as by being porous. For convenience, the ore and solid carbonaceous reductant can be admixed and fed to a conventional ball mill or similar attrition mill for reduction to the requisite size or can be subjected to fluid energy grinding techniques. Screening or like conventional classification can aid in this step also. Size reduction of some types of ilmenite ores may be necessary as they naturally occur in finely-divided form, eg. various beach sand ilmenites.

All flows and materials entering the reaction zone should be in admixture for prime operation of the process. Such mixture can be obtained by suitable premixing of all feeds or by providing an initial turbulent flow zone for proper mixing of the feeds. Of special importance to the present process, though, is that the intimate mixture of feeds (fresh ore, carbonaceous reductant, and chlorinating agent) passes through the reaction zone in substantially laminar (cocurrent) flow. Laminar flow is obtained conventionally when the Reynold's number (Re) for the fluid flow is less than about 2,000–3,000. Of course, turbulence and appreciable back-mixing are not consistent with laminar flow. It can be advantageous to operate the present process as a "dilute phase" chlorination process in order to ensure a substantially laminar flow regime in the reaction zone. For present purposes, "dilute phase" operation means that the weight concentration of solids entering the reaction zone (titaniferous feedstock and solid carbonaceous reductant, i.e. those solids not volatilized in the zone) per unit volume of inlet gases in the mixture (i.e. vaporous chlorinating agents, vaporous reductants and diluent carrier gases, if any) will not substantially exceed about 20 kg/m³. Within the range of operating conditions for the present process, generally the initial solids loading will range from about 1.6 to 20 kg/m³. Of course as the entering gases are heated in the zone, they will substantially expand, thus lowering the solids concentration. Also, as more vaporous products are produced than enter the reaction zone, further dilution of the solids loading will occur. Thus, the initial solids loading is an upper limit for the process as the solids loading will continually decrease through the reaction zone from the feed inlet to the product outlet of the zone.

It should be understood that the foregoing definition and description of dilute phase operation is based upon a substantial completeness of reaction of the titaniferous feedstock entering the reaction zone. In an operational mode of the preferred embodiment, when substantial incompleteness of reaction is reasonably likely, such as by using larger beach-sand sized feedstock, higher solids loadings (e.g., up to about 50-kg/m³ measured at STP) can compensate for such incompleteness by increasing the total surface area of feedstock solids in the reaction zone. Such higher surface area should equalize the absolute amount of product titanium chlorides exiting the reaction zone and recycle of the unreacted feedstock (reduced) solids will prevent loss of titanium from the overall process. Use of such larger-sized feedstock solids (and solid carbonaceous reductant) can assist in later gas/solids separation operations advisably used in conjunction with the present process. The description of FIG. 14 will expand and detail this alternative embodiment of the invention.

Also, all solids in the zone are entrained in vapors or gases flowing through the reaction zone. Such entraining gases and vapors typically include the inlet flow chlorinating agent and diluent carrier gases, if present, and product vapors formed from the reaction. Elemental iron formed during the reaction in the reaction zone can be very sticky and can cause appreciable agglomeration solids in the zone; thus, conventional fluidized bed chlorination operations are to be avoided. The present flow process minimizes (and substantially eliminates) occurrence of such agglomeration. Back-mixing (also prevalent in conventional fluidized bed operations) tends to promote undesirable side or intermediate reactions and imcompleteness of titanium chloride formation which is deleterious to the process. Superficial vapor velocities in the neighborhood of about 15 to 150 cm. per second generally are consistent with the requisite laminar flow (and dilute phase operation) for the present process. It should be appreciated also that for batch operation of the present process, the ore and carbonaceous reductant solids can be disposed as a fixed bed in the chlorination zone and the chlorinating agent passed through the stationary bed of solids under conditions such that substantially no turbulence or appreciable movement of such solids occurs. While such embodiment can be employed for practice of the present invention, practical continuous commercial scale operations usually do not lend themselves to practice of this embodiment.

It is possible to obtain an initial and at least coarse separation of by-product elemental iron from the vaporous product stream to be withdrawn from the reaction zone by maintaining at least the region near the outlet of such zone at a temperature in excess of about 1530° C. (i.e. above the melting point of elemental iron). The liquid elemental iron then can form a molten pool at the bottom of the zone for removal as pigs, for example, by conventional tapping techniques. Also, once the reaction of the contents in the reaction zone have reached equilibrium, the desired titanium chlroides are stable and laminar flow no longer need be maintained. Thus, a turbulent zone near the product outlet can be provided to assist in separating by-product or contaminant solids from product titanium chloride vapors, if desired.

The product stream withdrawn from the reaction zone contains titanium chloride vapors comprising titanium tetrachloride, carbon monoxide, elemental iron (if not already removed separately from the reaction zone), iron chlorides comprising ferrous chloride, and possibly unreacted carbonaceous reductant, and unreacted and partially reacted titaniferous solids (herein referred to as "processed titaniferous solids"). All chlorine from the chlorinating agent is reacted or consumed in the reaction zone. Most sources of iron-bearing titaniferous solids (notably, ores such as an ilmenite or the like) contain a variety of impurity metals (typically in minor amounts) which usually are chlorinated or reduced to elemental form in the reaction zone. Substantially all such impurity metal chlorides (or oxychlorides) are withdrawn from the reaction zone as vapors or soilds in the product stream, though most can be removed during later separation practices. Such impurity metals include, for example, niobium, vanadium (often recovered in oxychloride form) silicon, chromium, manganese, magnesium, tin, aluminum, and the like. Such impurity metal chlorides or oxychlorides in the product stream are deemed to be part of the crude titanium chloride vapors withdrawn from the present process.

Elemental iron withdrawn from the chlorination zone can be separated from product titanium chlorides by magnetic separation, density separation, or the like. After removal of the elemental iron from the product stream, titanium trichloride in the crude titanium chloride vapor stream advantageously is oxidized with make-up chlorine gas chlorinating agent to product titanium tetrachloride. Vaporous iron chlorides, usually vaporous ferrous chlorides, withdrawn with the product titanium chlorides can be easily removed from the product stream by quenching the stream to a temperature of around 200°–600° C., for example, for conversion of the vaporous iron chlorides into solid state form. The oxidized, purified titanium chloride stream then can be processed in conventional fashion, e.g. to produce $TiO_2$ pigment.

Most impurities in the product stream can be removed preferably by cycloning or similar separation techniques. It can be advantageous on occasion to oxidize the quenched solid state ferrous chloride particles to ferric chloride which can be more easily transported as a vapor (b.p. of about 320° C.) to the reaction zone as a recycle stream in the preferred embodiment. The extra chlorine used though must then be taken into account in the recycle to the reaction zone since $FeCl_3$ at the reaction temperatures is in equilibrium with $FeCl_2$ and $\frac{1}{2}Cl_2$. Further illustration of the operation of the present process is provided in the following detailed descriptions of FIGS. 13 and 14.

PREFERRED OPERATIONAL MODES OF THE PREFERRED EMBODIMENT

Figure 13:
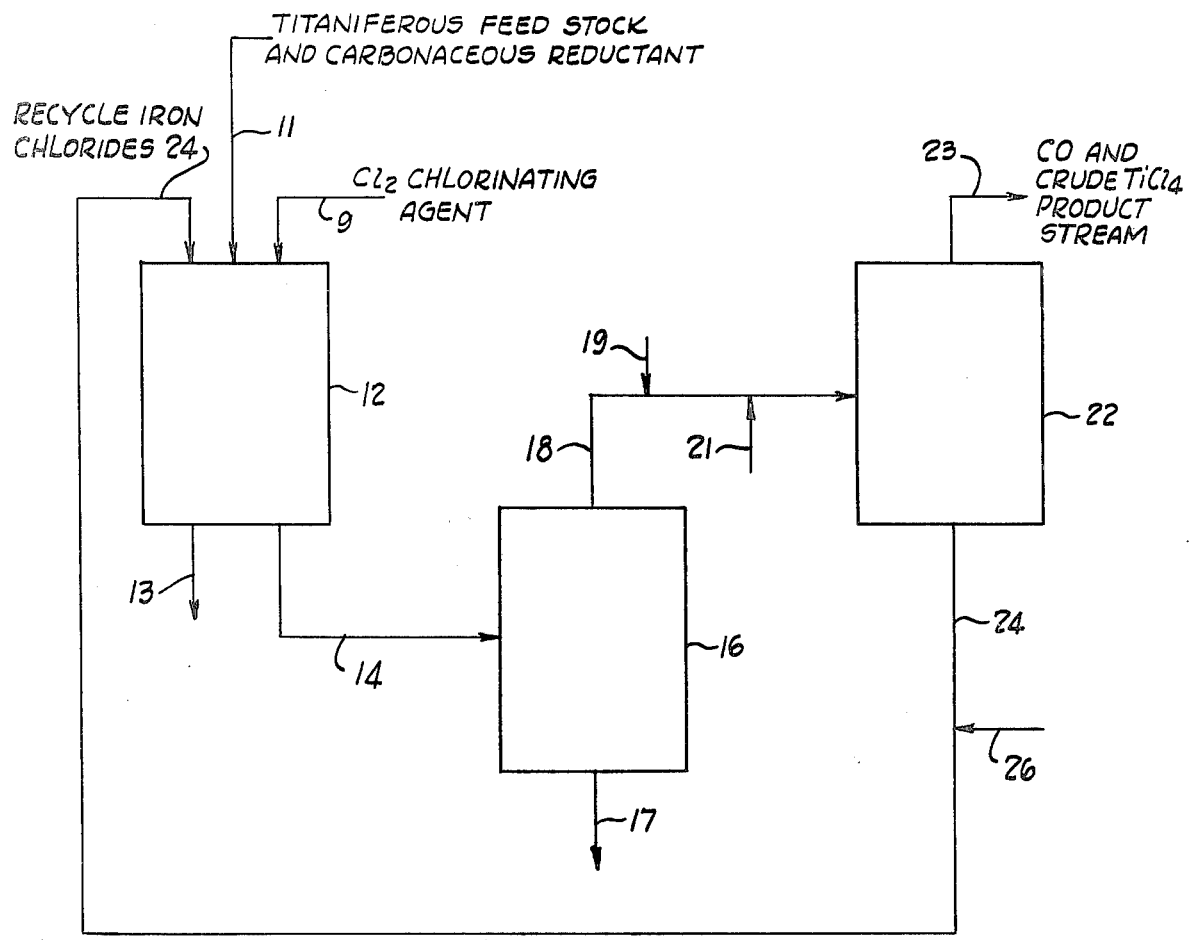
FIGS. 13 and 14 are flow diagrams depicting two methods of practicing the preferred embodiment of the present process. Instrumentation, controls, feeders, fittings, pumps, and valves are not shown, but are to be provided where necessary or desirable in conventional fashion. Materials of construction for this process are conventional for this type of high temperature, corrosive operation. Thus, the equipment can be composed of or lined with corrosion-resistant metals, alloy or refractory material (silica, fireclay, porcelain, etc.) Piping, duct work and the like will be of similar material and insulated where appropriate. Various of the equipment and lines illustrated can be multiple, series, cascade, or parallel connected for additional treating time, capacity, or refinement of separation and/or purification. These drawings will be discussed later herein.

Though the instant invention can be practiced in various fashions, two preferred operational modes are included in the drawings. Referring to FIG. 13, fresh titaniferous solids and carbonaceous reductant solids 11, chlorinating agent 9, and iron chlorides recycle stream 24 are passed into reaction zone 12 which is maintained at about 1350° to 1950°. The titaniferous solids and carbonaceous reductant solids are in finely-divided form (i.e. less than 44 microns in size) prior to entering reaction zone 12. Laminar flow is maintained through reaction zone 12, which suitably is a chlorinator, often with gradually increasing cross-sectional diameter for ensuring laminar flow therethrough. Advantageously, the laminar flow in zone 12 is directed downwardly in a vertically arranged chlorinator so that gravity will work in the direction of flow. Essentially atmospheric pressure is maintained in reaction zone 12, though often a slight positive pressure is desirable to prevent air admission should equipment leaks develop. Often an inert gas (eg. nitrogen) is used to maintain such positive pressure and assist in maintaining adequate flow rates and entrainment of all solids in the flow. Advantageously, outlet 13 is provided to remove any solids which settle out or to remove molten elemental iron collected when the region near the product stream outlet is maintained above 1530° C., and this collection effort may be aided with turbulent flow conditions thereat, if desired.

Product stream 14 (typically at about the reaction temperature) is withdrawn from reaction zone 12 and is passed into hot separation zone 16 which can be a cyclone or like separator. From hot separation zone 16 is withdrawn (a) overhead vapor stream 18 which contains crude $TiCl_4$ (including $TiCl_3$), carbon monoxide and vaporous iron chlorides (including $FeCl_2$) and (b) separated solids flow 17 which contains processed titaniferous solids (if any) and elemental iron (if not previously removed). Suitably, solids flow 17 is subjected to further separation (eg., magnetic separation) for recovery of by-product elemental iron.

Any $TiCl_3$ in overhead vapor (product) stream 18 is oxidized with make-up chlorinating agent 19 to $TiCl_4$. Make-up chlorinating agent 19 generally is not much more in amount than is stoichiometrically required to oxidize the $TiCl_3$ in product stream 18 to $TiCl_4$. Product stream 18 then is quenched to a temperature of around 200°–600° C., with quenching stream 21 for conversion of the vaporous iron chlorides into solid state form and such quenched flow passed into cool separation zone 22. Advantageously, quenching stream 21 is liquid $TiCl_4$ recycled from subsequent processing operations. From cool separation zone 22 is withdrawn CO and crude $TiCl_4$ product stream 23, and iron chlorides solids 24. Product stream 23 is sent to convention processing operations for subsequent conversion to $TiO_2$ pigment or other desired titanium products.

Iron chlorides solids 24 can have additional chlorinating agent 26 added thereto for conversion of $FeCl_2$ solids into $FeCl_3$ in such stream as $FeCl_3$ can be transported as a vapor (b.p. 320° C.). Of course, the chlorine content of the additional chlorinating agent 26 will have to be taken into account and appropriate adjustment of chlorinating agent 9 made, if necessary.

Of course, many alternative process steps and variations of the foregoing drawing are possible. For example, the titaniferous solids can be pre-reduced and/or pre-heated before entering reaction zone 12. Hot separation zone 16 and cool separation zone 22 can comprise three distinct zones. The first zone can remove solid Fe°, and ore and coke fines. The second zone can separate out impurity metal chlorides (eg. $MnCl_2$, $CaCl_2$, $MgCl_2$ etc.) after its feed stream is cooled to about 310° with liquid $TiCl_4$. The stream entering this second zone may also have $Cl_2$ added for oxidizing $TiCl_3$ to $TiCl_4$ and $FeCl_2$ to $FeCl_3$. The third zone then can separate the $FeCl_3$(s) after its feed stream is cooled with liquid $TiCl_4$ to about 200° C. Various alternatives are possible, of course, such as is described for FIG. 14 below.

Figure 14:
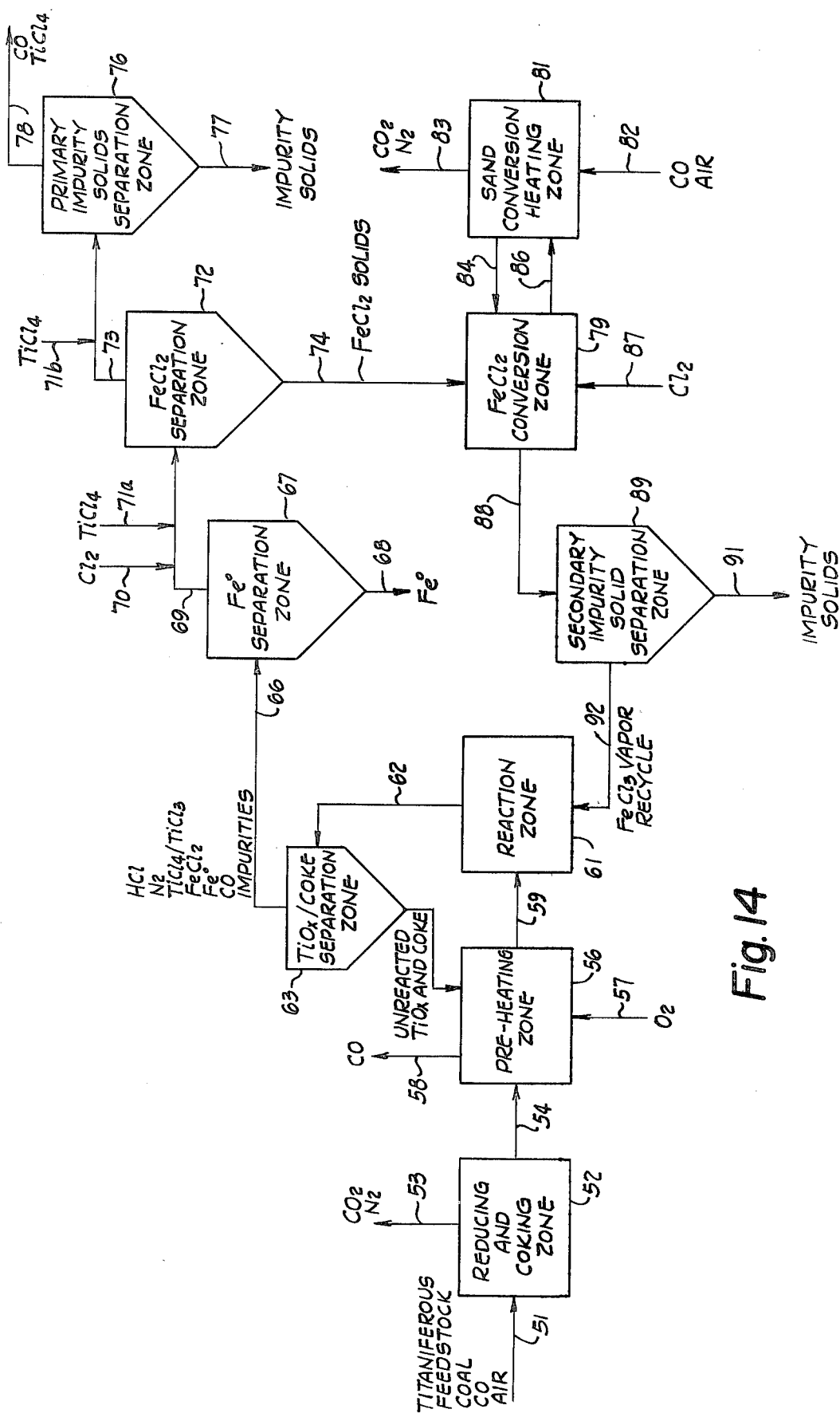

Referring to FIG. 14, salient features of this embodiment differing from the embodiment described in FIG. 13 include use of coal as the carbonaceous reductant and provisions for converting the coal into coke. Also, the titaniferous feedstock and coke are pre-heated to such a temperature that no heating of the reaction zone is required. Further, feedstock and coke solids entering the process are larger is size (eg. 50–100+ microns) so that incompleteness of reaction is expected. Recycle of unreacted feedstock in reduced form is provided to prevent loss of titanium from the process. Conjoint with the larger feed solids, higher solids loadings are used to increase the total surface area of solids in the reaction zone in order to obtain approximately the same absolute yield of titanium chlorides as complete (theoretical) conversion yields (i.e. 1 mole of $TiCl_4/TiCl_3$ product per 1 mole of Ti fed to reaction zone). The various separation steps also have been refined over the simplified scheme displayed in FIG. 13.

Referring to FIG. 14, titaniferous feedstock, coal, carbon monoxide, and air are fed through line 51 into reducing and coking zone 52 wherein the coal is coked and the titaniferous feedstock is conventionally reduced. Exhausted from zone 52 through line 53 are carbon dioxide and nitrogen. The reduced feedstock and coke are withdrawn from zone 52 through line 54 and passed into preheating zone 56. The temperature in preheating zone 56 is maintained by passing molecular oxygen via line 57 into such zone in order to be combusted with carbon therein with carbon monoxide being vented from such zone through line 58. In this preheating zone 56, the titaniferous feedstock and coke are preheated to such a temperature that when passed into reaction zone 61 subsequently, the desired reaction temperature will be maintained in reaction zone 61 without requiring heating of such reaction zone. It is possible, of course, to employ a single zone to simultaneously coke, reduce and preheat as explained above. The titaniferous feedstock and coke are withdrawn from preheating zone 56 through line 59 and then passed into reaction zone 61, which suitably is a chlorinator. Within reaction zone 61 is maintained the requisite laminar flow as required in the process. The chlorinating agent is ferric chloride/chlorine vapor recycle stream 92 which is passed into reaction zone 61 and this recycle stream will be explained later herein.

From reaction zone 61 all products are withdrawn through line 62 and passed into unreacted feedstock/coke separation zone 63. This separation zone separates the unreacted titaniferous feedstock and coke from remaining impure vapors (containing entrained fine solids such as Fe°) produced in the reaction zone and such solids are withdrawn from separation zone 63 through line 64 and passed into preheating zone 56. The impure vaporous stream separated in separation zone 63 is withdrawn therefrom through line 66 and such stream contains mainly HCl, $N_2$, $TiCl_4/TiCl_3$, $FeCl_2$, solid Fe°, CO, and a variety of impurities (vaporous and/or solid) typical of conventional chlorination processes. Such stream is passed into iron separation zone 6* wherefrom the solid metallic iron is separated and withdrawn through line 68. The remaining vapors are vented from iron separation zone 67 through line 69 which then is combined with liquid TiCl4 stream 71a in order to cool the stream sufficiently to convert the vaporous ferrous chloride therein into solid state ferrous chloride and with Cl2 stream 70 in order to oxidize any TiCl3 in the product stream into TiCl4. This cooled stream then is passed into ferrous chloride separation zone 72. From ferrous chloride separation zone 72 is withdrawn overhead vapor stream 73 which is additionally cooled by liquid TiCl4 stream 71b to further cool the stream to assist in separation of impurities contained therein. Such cooled stream is passed into primary impurity solid separation zone 76 wherefrom impurity solids are withdrawn through line 77 and product TiCl4/carbon monoxide are vented through line 78. A typical analysis of the impurity solids withdrawn from line 77 would show such stream to contain impurities including aluminum oxychloride, zirconium chloride, and niobium oxychloride.

Ferrous chloride solids are withdrawn from ferrous chloride separation zone 72 through line 74 and passed into ferrous chloride conversion zone 79. Ferrous chloride conversion zone 79 is maintained at a sufficient temperature in order to revolatilize the ferrous chloride solids passed therein and additionally the ferrous chloride is oxidized to ferric chloride by means of chlorine gas passed into such conversion zone through line 87. The amount of chlorine gas used is sufficient to oxidize the ferrous chloride into ferric chloride (it is easier to transport vaporous ferric chloride by performing this operation) and additionally sufficient chlorine is fed in order that the amount of chlorine in molecular form and that half mole coming from the ferric chloride is sufficient to conduct the reaction in reaction zone 61. The temperature of the ferrous chloride conversion zone 79 is maintained by use of sand conversion heating zone 81 which is fed with carbon monoxide and air through line 82 for combustion. Exhaust gases of carbon dioxide and nitrogen are vented from zone 81 through line 83. Conventional silica sand is quite useful in this sand conversion and heating zone 81. The hot sand is passed through line 84 into ferrous chloride conversion zone 79 and the cooled sand is recycled to heating zone 81 through line 86 to complete the cycle.

The ferric chloride/Cl2 vapor stream is vented from ferrous chloride conversion zone 79 through line 88 and passed into secondary impurities solids separation zone 89 wherefrom remaining impurity solids are withdrawn through line 91. Such impurity solids typically include magnesium chloride, calcium chloride, and manganese chloride. From this secondary separation zone 89 is withdrawn the FeCl3/Cl2 vapor recycle stream 92 which serves as the chlorinating agent which is passed into reaction zone 61 in order to complete the process.

There are, of course, various other schemes for practicing the present invention as the skilled artisan will appreciate. The following Examples show in detail how the present invention can be practiced but should not be construed as limiting. In this application, all temperatures are in degrees Centigrade, all mesh sizes are in United States Standard Sieves Series, and all units are in the metric system, unless otherwise expressly indicated.

EXAMPLE I

Equipment Description

Figure 15:
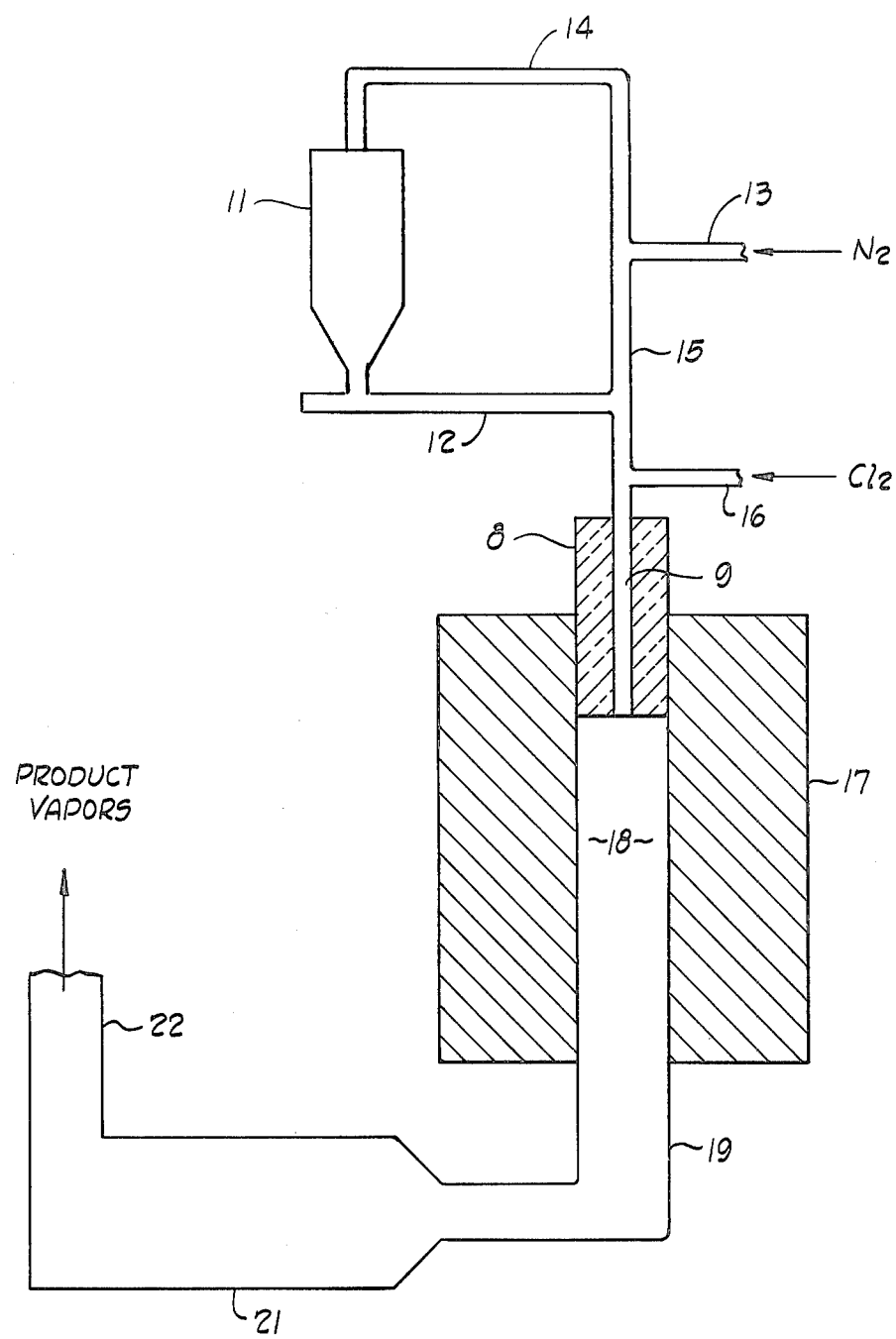
FIG. 15 is a schematic drawing of the apparatus used in the Examples and will be described in connection therewith.

In order to experimentally demonstrate the present invention, a dilute phase chlorination was conducted using the apparatus represented in FIG. 15. Hopper 11 contains the titaniferous ore/carbon mixture and is fed into line 15 by a screw feeder (not shown). Nitrogen carrier gas 13 is used in order to ensure that no chlorine gas backs up in line 15 and to equalize the pressure in hopper 11 through pressure-equalizing line 14. Chlorine gas chlorinating agent 16 enters line 15 and is combined with the ore/carbon mixture and nitrogen carrier gas flow.

The feed mixture (ore, carbon and Cl2) enters reactor 17 through inlet 9, which is insulated with insulation 8 which heat-seals reactor 17 and prevents premature heating of the reaction mixture. Reactor 17 is a tubular furnace defining reaction zone 18. Reaction zone 18 is tubular in shape with an ID of 5.2 cm. and effective length of about 30 cm (about half the total length of reactor 17). Since the outlet end of reactor 17 is not insulated, after about 30 cm in reaction zone 18, the temperature drops off sharply. Several thermocouples also are disposed in reactor 17 in order to monitor the temperature of reaction zone 18.

Reaction products exit reactor 17 through outlet 19 and flow into settling chamber 21 (expansion chamber) which is externally air-cooled. Reaction product solids and unreacted (and partially reacted) feed solids are collected in chamber 21. Product vapors are withdrawn from chamber 21 through chamber outlet 22 and are sent to analysis.

In this example, samples of the product vapors were analyzed periodically by an in-line gas chromatograph (not shown). The main flow of product vapors were directed into a tank of 10% sulfuric acid which also contained a small amount of a peroxide. Product titanium chlorides are scrubbed from the product vapors and dissolve in the sulfuric acid tank (TiCl4 complexes with the peroxide to give a visual confirmation of its presence). Carbon monoxide and nitrogen flow through the acid tank and such flow is also periodically analyzed by another in-line gas chromatograph.

Process Description

Reaction zone 18 is preheated with a flow of N2 to about 1350°–1400° C., after which the system is purged with argon. The argon is shut off and the feed solids and Cl2 flows are simultaneously commenced. The chlorination run is continued until steady-state is reached (constant gas compositions as measured by the in-line gas chromatographs), after which the run is discontinued and the products analyzed.

The following reactants and reaction conditions were employed.

| | | |
|---|---|---|
| Reaction Zone Temperature | | 1360° C. |
| N2 flow rate | | 10 cc/min |
| Cl2 flow rate (nominal) | | 50 cc/min |
| SOLIDS FEED | | |
| | Ilmenite | 50 parts by weight |
| | Coke | 50 parts by weight |
| | Powdered Fe° | 20 parts by weight |
| SOLIDS SIZE | | |
| | Ilmenite & coke | 4 microns (mean size) |
| | Powdered Fe° | 30–40 microns |
| ILMENITE COMPOSITION (wt-%) | | |
| | TiO2 | 56% |
| | Fe2O3 | 30% |
| | FeO | 5% |

|  | -continued | |
|---|---|---|
| Ilmenite | Fe/Ti (molar ratio) | = 0.65:1 |
| Ilmenite + Fe° | Fe/Ti (molar ratio) | = 1.65:1 |
|  | Cl₂/Ti (molar ratio) | = 0.56:1 |
| SOLIDS FEED RATE |  | 1.2 gm/min. |
| INLET SOLIDS LOADING |  | 20.3 Kg/m³ |
| TOTAL CHLORINATION TIME |  | 70 min. |

It should be noted that the powdered iron was included in the feed in order to ensure that the possibility of a total chlorination reaction was not possible, i.e. all prior art is consistent in predicting that the foregoing reactants would not form any titanium chlorides.

The following summarizes the results of the chlorination run.

| Feed (millimoles) |  |  |
|---|---|---|
|  | Cl₂ | 129 |
|  | TiO₂ | 230 |
|  | Fe Oxides | 150 |
|  | Fe° | 230 |
|  | C | 2,540 |
| Products (millimoles) |  |  |
|  | TiCl₄/TiCl₃ | 15.3 |
|  | FeCl₂ | 99 |
|  | Fe° | 265 |
|  | CO | 350 |
|  | CO₂ | 0.3 |
|  | Cl₂, COCL₂, CCl₄ | not detected |

Due to difficulty in recovery of all the products containing iron, there is a slight shortage of total iron in products, but this is not unexpected in laboratory scale testing.

The foregoing results clearly show that about 23% of the Cl₂ chlorinating agent was converted to product titanium chlorides despite the presence of excess metallic iron and iron oxides, and that some of the iron oxide in the ilmenite was converted into metallic iron. Most interestingly, FIGS. 1 and 2 which are plotted for Fe/Ti ratio of 1 and 2, respectively, show that at about 1360° C. with a Cl₂/Ti ratio of 0.56, that the conversion of titanium to titanium chlorides should be about 20%. This run is of course far from operating under the most favorable of conditions and further experimentation can only improve the process.

EXAMPLE II

The apparatus employed was the same as the apparatus represented in FIG. 15, except that line 16 conveying the chlorine gas chlorinating agent had been extended into insulation 8 parallel with inlet 9 to feed the chlorine gas directly into reacton zone 18. This arrangement precluded any premature reaction of chlorine in line 15 (as shown in FIG. 15 for Example I) prior to all feeds entering reaction zone 18. The process was conducted according to the procedure described in Example I.

The following reactants and reaction conditions were employed.

| Reaction Zone Temperature |  | 1380° C. |
|---|---|---|
| N₂ flow rate |  | 50 cc/min |
| Cl₂ flow rate |  | 195 cc/min |
| SOLIDS FEED |  |  |
|  | Reduced Ilmenite | 55 parts by weight |
|  | Coke | 45 parts by weight |
|  | Powdered Fe° | 637 parts by weight |

|  | -continued |  |
|---|---|---|
| SOLIDS SIZE |  |  |
|  | Ilmenite & coke | 4 microns (mean size) |
|  | Powdered Fe° | 20 microns (mean size) |
| ILMENITE COMPOSITION (wt-%) |  |  |
|  | Fe° | 35 |
|  | Ti₂O₃ | 62 |
| Ilmenite | Fe/Ti (molar ratio) | = 0.72/1.0 |
| Ilmenite + Fe° | Fe/Ti (molar ratio) | = 24.5/1.0 |
|  | Cl₂/Ti (molar ratio) | = 3.9/1.0 |
| SOLIDS FEED RATE |  | 3.0 gm/min. |
| INLET SOLIDS LOADING |  | 12.0 Kg/m³ |
| TOTAL CHLORINATION TIME |  | 30.0 min. |

Reduced ilmenite was made by heating a mixture of 70% by weight ilmenite and 30% by weight coke at a temperature of about 1200° C. for three hours in a static bed with a slow purge of nitrogen. The ilmenite/coke mixture had been ball-milled to the above-indicated size prior to the reduction operation.

The following summarizes the results of the chlorination run.

| Feed (millimoles) |  |  |
|---|---|---|
|  | Cl₂ | 229. |
|  | Ti Oxide | 49. |
|  | Total Fe° | 1197. |
|  | C | 412. |
| Products (millimoles) |  |  |
|  | TiCl₄/TiCl₃ | 9. |
|  | FeCl₂ | 216. |
|  | Fe° | 955. |
|  | CO | 22.4 |
|  | CO₂ | 0.01 |
|  | Cl₂, COCL₂, CCl₄ | not detected |

Due to difficulty in recovery of all of the products containing iron, there is a slight shortage of total iron in products, but this is not unexpected in laboratory scale testing. Also, a slight excess of CO was formed over that expected due to the probable presence of a minor quantity of moisture in the feed solids, a slightly oxidized surface of the Fe° solids, and a minor amount of O₂ impurity in the chlorine gas stream.

The foregoing results clearly show that about 7.9% of the Cl₂ chlorinating agent was converted to product titanium chlorides despite the presence of excess metallic iron and that about 18% of the titanium-content of the reduced ilmenite was chlorinated to titanium chlorides.

The addition of Fe° to the feed solids ensured that no total chlorination process would be possible. This was confirmed in a separate experiment wherein the foregoing experiment was repeated under the same reaction conditions using a feed consisting only of 15% by weight coke and 85% by weight powdered Fe°, i.e. sans any titaniferous feedstock. The solids product formed consisted of FeCl₂ (no FeCl₃), unreacted Fe°, and unreacted C. Gas chromatography showed the product vapors to be N₂ and CO (no free Cl₂ was found). Thus, the reaction of Cl₂ with Fe° was complete in this separate experiment.

I claim:

1. A flow process for chlorinating ferruginous titaniferous material having an iron to titanium molar ratio (Fe/Ti) of x:1, x being a positive number having a value of at least about 0.25, for producing titanium chlorides and by-product metallic iron, which comprises passing through a reaction zone maintained at about 1050°–1950° C. in substantially laminar flow a mixture of said titaniferous material in finely-divided form; carbonaceous reductant; and a chlorinating agent selected from the group consisting of chlorine gas, HCL, an organo-chloride, and mixtures thereof; there being not more than (x+2) moles of chlorine provided from said chlorinating agent per gram atom of titanium in said titaniferous material, the atomic ratio of carbon in said mixture to the oxygen content in said mixture being greater than 1:1 for formation of CO, withdrawing from said zone a product stream containing said titanium chlorides comprising $TiCl_4$, said by-product metallic iron, carbon monoxide, and iron chlorides comprising $FeCl_2$, the molar ratio of chlorine from said chlorinating agent to said titanium in said titaniferous solids ($Cl_2/Ti$), said iron to titanium ratio (Fe/Ti) in said titaniferous solids, and said reaction zone temperature being those whereby neither all of said chlorine nor all of said iron in said titaniferous solids is converted into iron chlorides withdrawn from said zone; and separating at least said titanium chlorides and said by-product metallic iron from said product stream.

2. The process of claim 1 wherein said iron to titanium ratio (Fe/Ti) is between about 0.25:1 and 100:1.

3. The process of claim 2 wherein said ratio is between about 0.5:1 and 2:1.

4. The process of claim 1 wherein said reaction zone temperature is between about 1250° and 1750° C.

5. The process of claim 1 wherein said Fe/Ti ratio is between about 0.5:1 and 2:1 and said $Cl_2/Ti$ ratio is between about 2:1 and 3.5:1, and said reaction zone temperature is between about 1300° and 1600° C.

6. The process of claim 1 wherein said Fe/Ti ratio, said $Cl_2/Ti$ ratio, and said reaction zone temperature are those whereby at least about 75% of said titanium in said titaniferous material is converted into titanium chlorides.

7. The process of claim 6 wherein said Fe/Ti ratio is between about 0.5:1 and 2:1, said reaction zone temperature is between about 1300° and 1600° C., and said $Cl_2/Ti$ ratio is between about 2.2:1 and 3.5:1.

8. The process of claim 1 wherein said chlorinating agent is chlorine gas.

9. The process of claim 1 wherein said carbonaceous reductant is in finely-divided solid form.

10. The process of claim 9 wherein the weight concentration of said titaniferous solids and said carbonaceous reductant solids in said inlet gases in said mixture is not substantially greater than about 20 kg/$m^3$.

11. The process of claim 10 wherein said concentration is between about 1.6 and 20 kg/$m^3$.

12. The process of claim 1 wherein said coke is made by coking coal.

13. The process of claim 1 wherein said titaniferous material is pre-reduced prior to passing it into said reaction zone.

14. The process of claim 12 wherein said titaniferous material is pre-reduced simultaneously with said coking.

15. The process of claim 1 wherein said solid titaniferous material and said solid carbonaceous reductant in admixture are pre-heated to a temperature sufficient to maintain said reaction zone at about 1350° to 1950° C.

16. A flow process for chlorinating ferruginous titaniferous solids having an iron to titanium molar ratio of between about 0.25:1 and 5:1 for producing titanium chlorides and by-product metallic iron, which comprises:

passing through a reaction zone maintained at about 1300° to 1600° C. in substantially laminar flow a mixture of said titaniferous solids in finely-divided form; finely-divided solid carbonaceous reductant; and a chlorinating agent selected from the group consisting of chlorine gas, HCl, an organo-chloride and mixtures thereof, there being at least about 2 but not more than 7 moles of chlorine provided from said chlorinating agent per gram-atom of titanium in said titaniferous material, the atomic ratio of carbon in said mixture to the oxygen content in said mixture being greater than 1:1 for formation of CO, withdrawing from said zone a product stream containing titanium chlorides comprising $TiCl_4$, said by-product metallic iron, carbon monoxide, and iron chlorides comprising $FeCl_2$, the molar ratio of chlorine from said chlorinating agent to said titanium in said titaniferous solids ($Cl_2/Ti$), said iron to titanium ratio in said titaniferous solids (Fe/Ti), and said reaction zone temperature being those whereby neither all of said chlorine nor all of said iron is converted into iron chlorides withdrawn from said zone, and separating at least said titanium chlorides and said by-product metallic iron from said product stream.

17. The process of claim 16 wherein said $Cl_2/Ti$ ratio, said Fe/Ti ratio, and said reaction zone temperature are those whereby essentially all of said titanium is converted into titanium chlorides.

18. The process of claim 16 wherein said chlorinating agent is chlorine gas.

19. The process of claim 18 wherein the weight concentration of said titaniferous solids and said carbonaceous reductant solids in the inlet flow gases in said mixture is not substantially above about 20 kg/$m^3$.

20. A flow process for essentially completely chlorinating the titanium content of ferruginous titaniferous material whereby essentially all the iron content is converted to metallic form which comprises:

passing through a reaction zone maintained at about 1350° to 1950° C. in substantially laminar flow a mixture of said titaniferous material in finely-divided solid form and having a molar ratio of iron to titanium (Fe/Ti) of not above 2; carbonaceous reductant; a chlorinating agent selected from the group consisting of chlorine gas, HCl, an organo-chloride, and mixtures thereof; and iron chlorides recycled from a later step of the process, the molar ratio of said iron chlorides recycled to said titanium ($FeCl_2/Ti$) being not substantially above about 1 and the molar ratio of the chlorine in said chlorinating agent to said iron chlorides recycled ($Cl_2/FeCl_2$) being not substantially less than about 2:1, the atomic ratio of carbon in said mixture to the oxygen content in said mixture being greater than 1:1 for formation of CO, there being no more than about 2 moles of chlorine from said chlorinating agent per gram-atom of titanium in said titaniferous solids, and said Fe/Ti ratio in said titaniferous material and said reaction zone temperature being those whereby the net chlorination of said titanium and reduction of said iron is in a steady-state;

withdrawing from said zone a product stream containing titanium chlorides comprising $TiCl_4$, by-product metallic iron, carbon monoxide, and iron chlorides comprising ferrous chloride, separating from said withdrawn product stream said iron chlorides, said titanium chlorides, and said by-product metallic iron; and recycling said separated iron chlorides to said reaction zone.

21. The process of claim 20 wherein said Fe/Ti ratio is between about 0.25:1 and 1.65:1.

22. The process of claim 20 wherein said reaction zone temperature is between about 1350° and 1650° C.

23. The process of claim 22 wherein Fe/Ti ratio is between about 0.25:1 and 1.65:1.

24. The process of claim 20 wherein at least about 75% each of said titanium and said iron in said titaniferous material is converted to titanium chlorides and metallic iron, respectively.

25. The process of claim 24 wherein said conversion is at least about 85%.

26. The process of claim 25 wherein said conversion is at least about 90%.

27. The process of claim 20 wherein said chlorinating agent is chlorine gas.

28. The process of claim 20 wherein said carbonaceous reductant is in finely-divided solid form.

29. The process of claim 28 wherein the weight concentration of said titaniferous solids and said reductant solids in inlet gases in said mixture is not substantially greater than about 20-kg/m$^3$.

30. The process of claim 29 wherein said concentration is between about 1.6 to 20-kg/m$^3$.

31. The process of claim 20 wherein said iron chlorides are separated from said product stream by quenching said product stream to a temperature sufficient to convert said vaporous iron chlorides into solid state form.

32. The process of claim 30 wherein said quenching is to a temperature of about 200° to 600° C.

33. The process of claim 20 wherein said elemental iron is separated from said product stream and TiCl$_3$ in the remaining product stream is oxidized to TiCl$_4$ with make-up chlorinating agent.

34. The process of claim 28 wherein said solid carbonaceous reductant is coke.

35. The process of claim 34 wherein said coke is made by coking coal.

36. The process of claim 20 wherein said titaniferous material is prereduced prior to passing it into said reaction zone.

37. The process of claim 35 wherein said titaniferous material is prereduced simultaneously with said coking.

38. The process of claim 20 wherein said solid titaniferous material and said solid carbonaceous reductant in admixture are pre-heated to a temperature sufficient to maintain said reaction zone at about 1350° to 1950° C.

39. The process of claim 16 wherein any unreacted titaniferous material withdrawn from said zone is separated from said product stream and recycled to said zone.

40. A flow process for essentially completely chlorinating the titanium content of ferruginous titaniferous material whereby essentially all the iron content is converted to metallic form, which comprises:

passing through a reaction zone maintained at about 1350° to 1950° C. in substantially laminar flow a mixture of said titaniferous material in finely-divided solid form and having a molar ratio of iron to titanium (Fe/Ti) of about 0.25:1 to 1.65:1; finely-divided solid carbonaceous reductant; a chlorinating agent selected from the group consisting of chlorine gas, HCl, an organo chloride, and mixtures thereof; and iron chlorides recycled from a later step of the process, the molar ratio of said iron chlorides recycled to said titanium (FeCl$_2$/Ti) being not substantially above about 1 and the molar ratio of the chlorine in said chlorinating agent to said iron chlorides recycled (Cl$_2$/FeCl$_2$) being not substantially less than about 2:1, the atomic ratio of carbon in said mixture to the oxygen content in said mixture being greater than 1:1 for formation of CO, there being no more than about 2 moles of chlorine from said chlorinating agent per gram-atom of titanium in said titaniferous solids, and said Fe/Ti ratio in said titaniferous material and said reaction zone temperature being those whereby the net chlorination of said titanium and reduction of said iron is in a steady-state;

withdrawing from said zone a product stream containing titanium chlorides comprising TiCl$_4$, by-product metallic iron, carbon monoxide, and iron chlorides comprising ferrous chloride, separating said metallic iron from said product stream;

oxidizing any TiCl$_3$ in said remaining product stream to TiCl$_4$ with make-up chlorinating agent;

separating said iron chlorides from said oxidized product stream by quenching said stream to a temperature of about 200° to 600° C. to convert said iron chlorides to solid state form;

recycling said separated iron chlorides to said reaction zone; and withdrawing from said process said separated metallic iron and a vaporous product stream of said crude TiCl$_4$ and CO.

41. The process of claim 40 wherein said chlorinating agent is chlorine gas.

42. The process of claim 40 wherein the weight concentration of said titaniferous solids and reductant solids in inlet gases in said mixture is not substantially greater than about 20-kg/m$^3$.

* * * * *